Feb. 22, 1927.

A. BREWER

SPRING TIRE

Filed Nov. 30, 1925

Inventor

Alca Brewer

Patented Feb. 22, 1927.

1,618,168

UNITED STATES PATENT OFFICE.

ALCA BREWER, OF WENTWORTH, MISSOURI.

SPRING TIRE.

Application filed November 30, 1925. Serial No. 72,263.

This invention relates to tires for vehicles and has more particular reference to a tire of the spring type usually adapted and employed for use upon the wheels of a vehicle in lieu of the pneumatic or solid rubber type of tire.

The primary object of this invention resides in the provision of such a tire that may be readily assembled and applied to wheels of various constructions and that will afford as relatively easy riding qualities for the vehicle as is now secured by the use of pneumatic or solid rubber tires and this without the consequent liability of the tire becoming punctured or otherwise disrupted necessitating the application of other tires while the vehicle is upon the road.

A further and important object of the invention is to substantially improve and simplify over similar constructions previously used and patented.

With the foregoing and other objects in view as the nature of the invention will be better understood, the same comprises the novel form, combination and arrangement of parts hereinafter more fully described and shown in the accompanying drawing and claimed.

In the drawing wherein like reference characters designate corresponding parts throughout the several views:—

Figure 1:
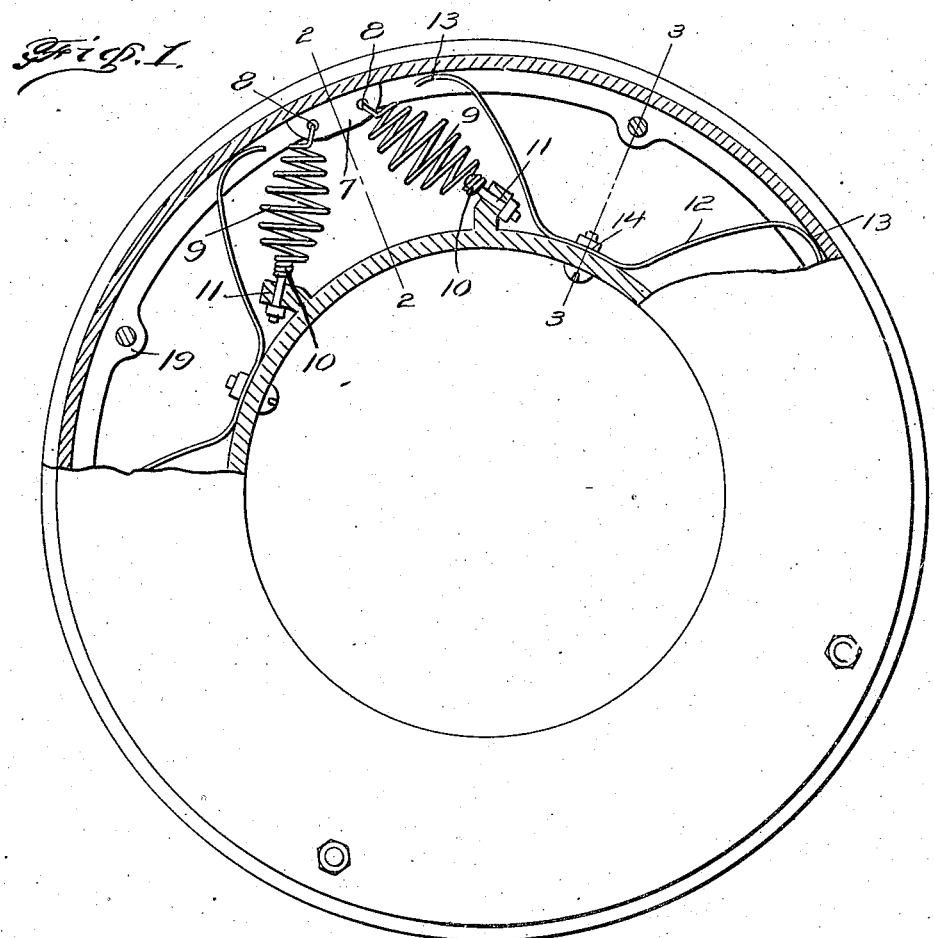
Figure 1 is a view partly in elevation and partly in cross section of my improved tire.
Figure 2:
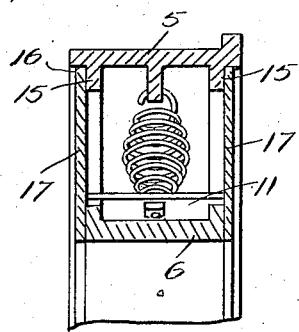
Fig. 2 is a detail section taken substantially upon the line 2—2 of Fig. 1.
Figure 3:
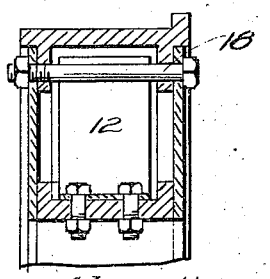
Fig. 3 is a similar view taken substantially upon the line 3—3 of the same figure.

Now having particular reference to the drawing wherein the novel tire constitutes the provision of an inner and outer rim 5 and 6 respectively arranged in concentric relation as per Figs. 2 and 3. The outer rim 5 is formed internally at predetermined spaced points with pendant ears 7 at the opposite ends of which are openings 8 within which are secured certain ends of coil springs 9—9 that extend in converging relation and have their opposite ends adequately secured as at 10—10 to lugs 11—11 that are formed upon the exterior surface of the inner rim 6 opposite the respective ends of the outer rim ear 7, Fig. 1. These springs obviously serve as a means for preventing the entire outer displacement of the inner and outer rims with respect to each other.

As will be obvious, sets of the springs 9—9 are provided and intermediate any two adjacent sets thereof is a generally U-shaped leaf spring 12, the legs of which extend outwardly and diverge in relation and are overturned at their outer ends as at 13 for frictional contact with the interior surface of the outer rim 5, Fig. 1. These springs 12 are rigidly connected as at 14 through the inner rim 6 and serve as a medium for maintaining the rims in proper spaced relation with respect to each other and also for forcing the rim 5 outwardly of the rim 6 at points of unengagement of the outer rim with the road surface.

The outer rim 5 is formed with circumferential flanges 15—15 upon the inner side of the rim and in slightly spaced relation with the opposite edges thereof for providing shoulders 16 against which rest ring-like plates 17—17 that engage at their inner edges alongside of the opposite edges of the inner rim 6 for preventing lateral displacement of the rims 5 and 6, said ring-like plates being rigidly secured to the outer rim 5 through the cross bolts 18 which extend to alined openings in the plates and ears 19 formed at predetermined spaced points on the flanges 15—15.

The outer surface of the rim 5 may be so formed as to receive a solid rubber band for increasing the traction properties of the outer rim, but I do not desire to be limited to the use of such a band.

From the foregoing description when considered in conjunction with the accompanying drawing, it is believed by me that the advantages and operation of a spring wheel of this character will be readily apparent to those skilled in the art, and even though I have herein shown and described the most preferred embodiment of the invention with which I am at this time familiar, it is nevertheless to be understood that minor changes may be made therein without departing from the spirit and scope of the appended claim.

Having thus described my invention, what I claim as new and desire to secure by Letters Patent is:

In a spring wheel of the class described, inner and outer rims disposed in substantially concentric spaced relation, said rims being of channel shaped cross section and having their flanges directed toward each other, side rings fastened to the flanges on the outer rim member and slidably contacting the flanges on the inner rim member and forming an annular chamber between the rims and rings, and a plurality of circumferentially spaced ears carried by the inner periphery of the outer rim, a plurality of pairs of lugs carried by the outer periphery of the inner rim, the ears being disposed at points between the pairs of lugs, sets of coiled springs, each set being connected with a pair of lugs and an adjacent ear, and a plurality of substantially U-shaped springs, the bight portions of which are fastened to the inner rim, the extremities of the arms of said members being curved and bearing slidably against the inner periphery of said outer rim.

In testimony whereof I affix my signature.

ALCA BREWER.